United States Patent
Mendiola et al.

(10) Patent No.: US 12,131,037 B2
(45) Date of Patent: *Oct. 29, 2024

(54) METHOD AND SYSTEM FOR DATA TRANSMISSION

(71) Applicant: Practechal Solutions, Inc., Redondo Beach, CA (US)

(72) Inventors: Joshua Mendiola, San Jose, CA (US); Jonathan Adam, Austin, TX (US); Darren Furtado, Redondo Beach, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 16/990,040

(22) Filed: Aug. 11, 2020

(65) Prior Publication Data
US 2020/0371701 A1    Nov. 26, 2020

Related U.S. Application Data

(62) Division of application No. 16/777,737, filed on Jan. 30, 2020, now Pat. No. 11,698,733.
(Continued)

(51) Int. Cl.
*G06F 3/06*     (2006.01)
*G06F 12/02*    (2006.01)
(Continued)

(52) U.S. Cl.
CPC .......... *G06F 3/0631* (2013.01); *G06F 3/0608* (2013.01); *G06F 3/0659* (2013.01);
(Continued)

(58) Field of Classification Search
CPC ....... H04L 45/24; H04L 1/189; H04L 45/127; H04L 47/2416; H04L 67/12; H04L 45/28;
(Continued)

(56) References Cited

U.S. PATENT DOCUMENTS 6,870,816 B1 *   3/2005   Edwards ................. H04L 45/20
                                                          370/338
7,533,805 B1     5/2009   Enright et al.
(Continued)

FOREIGN PATENT DOCUMENTS

EP        3142325 A1      3/2017
JP     2008090861 A       4/2008
(Continued)

OTHER PUBLICATIONS

Fujimura et al., machine generated translation of WO 2007/069658 A 1, Jun. 2007 (Year: 2007).
(Continued)

*Primary Examiner* — Mehmood B. Khan
(74) *Attorney, Agent, or Firm* — Kari L. Barnes

(57) ABSTRACT

An exemplary communication method and system is disclosed. The system may be configured to create a mesh network of nodes for routing and/or rerouting data communications depending on the integrity of or demands on the system to improve efficiency and transmission confidence. The system may be configured to redundantly, simultaneously send data transmissions on different transmission interfaces using different transmission protocols.

16 Claims, 10 Drawing Sheets

Related U.S. Application Data

(60) Provisional application No. 62/798,947, filed on Jan. 30, 2019, provisional application No. 62/798,931, filed on Jan. 30, 2019, provisional application No. 62/798,940, filed on Jan. 30, 2019, provisional application No. 62/798,964, filed on Jan. 30, 2019.

(51) Int. Cl.
| | |
|---|---|
| *G06F 16/2455* | (2019.01) |
| *H04L 1/1867* | (2023.01) |
| *H04L 45/24* | (2022.01) |
| *H04L 67/1097* | (2022.01) |
| *H04N 7/18* | (2006.01) |
| *H04W 28/04* | (2009.01) |
| *H04W 76/14* | (2018.01) |
| *H04W 76/16* | (2018.01) |
| *H04W 84/18* | (2009.01) |
| *H04W 88/06* | (2009.01) |
| *H04L 1/00* | (2006.01) |

(52) U.S. Cl.
CPC .......... *G06F 3/067* (2013.01); *G06F 12/0246* (2013.01); *G06F 16/24568* (2019.01); *H04L 1/189* (2013.01); *H04L 45/24* (2013.01); *H04L 67/1097* (2013.01); *H04N 7/18* (2013.01); *H04N 7/181* (2013.01); *H04W 28/04* (2013.01); *H04W 76/14* (2018.02); *H04W 76/16* (2018.02); *H04L 2001/0097* (2013.01); *H04W 84/18* (2013.01); *H04W 88/06* (2013.01)

(58) Field of Classification Search
CPC ....... H04L 1/22; H04L 67/34; H04L 67/1097; H04L 69/18; H04L 1/08; H04L 45/3065; H04L 2001/0097; H04N 7/181; H04N 7/18; G06F 12/0246; G06F 3/0659; G06F 3/067; G06F 3/0608; G06F 3/0631; G06F 16/24568; H04W 28/04; H04W 76/14; H04W 76/16; H04W 84/18; H04W 88/06; H04W 52/48
See application file for complete search history.

(56) References Cited

U.S. PATENT DOCUMENTS

| | | | |
|---|---|---|---|
| 7,734,643 B1 | 6/2010 | Waterhouse | |
| 8,000,684 B1* | 8/2011 | Bhan ..................... | H04W 52/38 455/412.2 |
| 9,167,313 B1 | 10/2015 | Bacco | |
| 9,900,546 B2 | 2/2018 | Hirose et al. | |
| 10,469,805 B2 | 11/2019 | Wang et al. | |
| 10,523,901 B2 | 12/2019 | DeKeyser | |
| 2003/0117500 A1 | 6/2003 | Lin | |
| 2004/0105450 A1 | 6/2004 | Ikuta et al. | |
| 2004/0168199 A1* | 8/2004 | Phillips .............. | H04N 21/4316 725/111 |
| 2006/0204229 A1 | 9/2006 | Onodera | |
| 2006/0236375 A1 | 10/2006 | Hammadou | |
| 2007/0250883 A1 | 10/2007 | Busch et al. | |
| 2008/0165249 A1 | 7/2008 | DeKeyser | |
| 2011/0060669 A1* | 3/2011 | Laves ................... | H04L 65/611 380/255 |
| 2011/0169950 A1 | 7/2011 | Weaver | |
| 2012/0079096 A1 | 3/2012 | Cowan et al. | |
| 2013/0235192 A1* | 9/2013 | Quinn .................... | G08B 29/16 348/143 |
| 2013/0336499 A1* | 12/2013 | Beckhardt ............. | H04W 16/14 381/81 |
| 2014/0232874 A1 | 8/2014 | Meyer | |
| 2014/0310492 A1 | 10/2014 | Motwani et al. | |
| 2014/0334375 A1* | 11/2014 | Sugitani ................ | H04L 1/1835 370/315 |
| 2015/0186073 A1 | 7/2015 | Pacurariu et al. | |
| 2015/0220478 A1 | 8/2015 | Klughart | |
| 2016/0057391 A1 | 2/2016 | Block et al. | |
| 2016/0142670 A1 | 5/2016 | Watanabe | |
| 2016/0352800 A1* | 12/2016 | Mulcahy ................. | H04L 43/08 |
| 2017/0048021 A1 | 2/2017 | Yanovsky et al. | |
| 2017/0094226 A1* | 3/2017 | Guzik ..................... | H04L 67/06 |
| 2017/0099214 A1* | 4/2017 | Border ................ | H04L 47/6275 |
| 2017/0099463 A1 | 4/2017 | Trani | |
| 2017/0103643 A1 | 4/2017 | Powers, III et al. | |
| 2017/0181211 A1* | 6/2017 | Han ....................... | H04L 47/122 |
| 2017/0215160 A1* | 7/2017 | Löhr ...................... | H04W 76/14 |
| 2017/0230605 A1 | 8/2017 | Han et al. | |
| 2018/0103197 A1 | 4/2018 | Campbell et al. | |
| 2018/0109966 A1* | 4/2018 | Alexander ............. | H04W 24/04 |
| 2018/0181844 A1 | 6/2018 | Barnett et al. | |
| 2018/0199237 A1 | 7/2018 | Vare et al. | |
| 2018/0218073 A1 | 8/2018 | Wilshinsky et al. | |
| 2018/0367230 A1* | 12/2018 | Su ........................ | H04W 72/1215 |
| 2019/0200193 A1* | 6/2019 | Bae ....................... | H04W 8/005 |
| 2020/0178060 A1 | 6/2020 | Gladish et al. | |
| 2020/0221518 A1* | 7/2020 | Schmitz ................. | H04W 76/14 |
| 2020/0371701 A1* | 11/2020 | Mendiola ................ | H04L 1/189 |
| 2020/0412669 A1* | 12/2020 | Schubert ................ | H04L 45/44 |
| 2021/0212116 A1* | 7/2021 | Chu ...................... | H04W 74/085 |

FOREIGN PATENT DOCUMENTS

| | | | | |
|---|---|---|---|---|
| KR | 20080022837 A | 3/2008 | | |
| WO | 2007069658 A1 | 6/2007 | | |
| WO | WO-2015027764 A1 * | 3/2015 | ............. | H04L 69/16 |

OTHER PUBLICATIONS

International Preliminary Report on Patentability for International Application No. PCT/US2020/015865, dated Aug. 12, 2021, 8 pages.

International Preliminary Report on Patentability for International Application No. PCT/US2020/015916, dated Aug. 12, 2021, 8 pages.

International Preliminary Report on Patentability for International Application No. PCT/US2020/015944, dated Aug. 12, 2021, 9 pages.

International Search Report and Written Opinion for International Application No. PCT/US2020/015665, dated Jun. 3, 2020, 10 pages.

International Search Report and Written Opinion for International Application No. PCT/US2020/015916, dated Apr. 27, 2020, 8 pages.

International Search Report and Written Opinion for International Application No. PCT/US2020/015944, dated Apr. 16, 2020, 9 pages.

* cited by examiner (1)
   Meta Buffer
```
+--------+
| Line#1 |
+---+----+
    |
    v
  {Out#1} -> Meta Ledger 1
```

(2)
   Prefix Mode Dependency (Meta Buffer 2)
```
      +----+
      |    |
      v    |
+--------+-+------+
| Line#1 | Line#2 |
+--------+---+----+
             |
             v
         {Out#2} -> Meta Ledger 1+2
```

(3)
```
        Prefix   Prefix
        +----+   +----+
        |    |   |    |
        v    |   v    |
+--------+-+------+-+------+
| Line#1 | Line#2 | Line#3 |
+--------+--------+---+----+
                      |
                      v
                  {Out#3} -> Meta Ledger 1+2+3
```

(4)
Prefix Mode Dependency Read <- (Meta Buffer 2)

```
    +----+
    |  |
    v  |
+--------+-+------+
| Line#1 | Line#2 |
+--------+---+----+
         |
         v
    {In#2} <- Meta Ledger 1+2
```

(5)
Meta Buffer Read

```
+--------+
| Line#1 |
+---+----+
    |
    v
{In#1} <- Meta Ledger 1
    +--+ --<
       API<- {Out#1} := O{(N/B->log->M/B<-N/B)}T <- File Reconstruction
```

FIG. 9B

METHOD AND SYSTEM FOR DATA TRANSMISSION

PRIORITY

This application claims priority as a divisional to U.S. patent Ser. No. 16/777,737, filed Jan. 30, 2020, which claims priority to U.S. Provisional Application No. 62/798,931, filed Jan. 30, 2019; U.S. Provisional Application No. 62/798,940, filed Jan. 30, 2019; U.S. Provisional Application No. 62/798,947, filed Jan. 30, 2019; and U.S. Provisional Application No. 62/798,964, filed Jan. 30, 2019, each of which is incorporated by reference in its entirety herein.

BACKGROUND

FIG. 1 illustrates an exemplary surveillance system 100 in which a plurality of cameras 102 capture images from a viewing area 104 and transmit the data from the captured images along data communication path 106 to a storage unit 108. The captured images may be captured stills or as a video feed. The captured data is communicated over a cabled connection to a data cabinet to be captured and recorded. Each of the cameras capture individual data streams that correspond to the respective viewing area 104 and store the respective data streams in the storage unit 108. The storage unit may be any conventional storage system, such as a redundant array of independent disks (RAID) in which multiple hard drives are stored together, to provide sufficient storage for the data streams of the captured images from the plurality of cameras. If a video feed is needed, then a user goes to the storage unit 108 and retrieves the stored information for the corresponding camera of interest.

The surveillance system environment is used as an exemplary representation of conventional applications requiring large data management and transmission. These traditional system conventionally hardwire communication paths from the camera to the data storage unit. Such communication is costly and time intensive to install, maintain, or upgrade. Wireless systems may be use but the data is subject to transmission failures and interception.

SUMMARY

The present embodiments provide exemplary methods and systems for data management and transmissions. Although exemplary embodiments are described herein in terms of surveillance management, other applications are also foreseen. Although exemplary embodiments described herein include different system configurations, components, and protocols, exemplary embodiments are not so limited. For example, exemplary applications may use any portion, hardware, software, component, algorithm, or part described herein in any combination. Exemplary embodiments may use the distributive storage and/or redundant communication in this or other applications.

Exemplary embodiments include a plurality of a data transmission nodes. The node may include a processor, memory, and one or more communication ports. Each node may include software, hardware, or a combination thereof that is configured to store data received by one or more of the nodes, communicate to one or more of the other nodes, pass information from one or more of the devices/nodes to one or more other of the devices/nodes.

Exemplary embodiments include a consolidated communications device, including a processor, memory, and a plurality of communications interfaces. The plurality of communication interfaces may include any combination of 802.x, LTE, TV White Space, WIMAX radio, WiFi, or any other wired or wireless communication protocol.

In an exemplary embodiment, the memory of the consolidated communications device may include non-transitory machine readable instructions that when executed by the processor is configured to process traffic across the plurality of communication interfaces in different protocols. The machine readable instructions may include a software based routine system running locally via a virtual machine. The non-transitory machine readable instructions include routing tables and instructions to configured the device to transmit data using routing marks sent through the plurality of communication interfaces.

In an exemplary embodiment, the consolidated communications device may be configured to perform different functions. For example, the consolidated communication device may be configured to resend a data transmission on a different communication interface upon receipt of a retransmit indicator. The consolidated communications device may be configured to receive a data packet and determine whether the data packet is a complete data packet. The consolidated communication device may be configured to send the data packet if the consolidated communication device determines the data packet is a complete data packet. The consolidated communication device may be configured to wait for a duplicate data packet sent across another of the plurality of communication interfaces and determine whether the duplicate data packet is a complete data packet. The consolidated communication device may be configured to send a resend request if the duplicate data packet is not a complete data packet.

In an exemplary embodiment, a plurality of consolidated communications devices may be used to define a mesh network. The system of consolidated communications devices may be configured to retransmit a failed data transmission packet between two consolidated communications devices on a different communication interface than an original transmission. The system may retransmit a failed data transmission packet between two consolidated communications devices on a communication interface as the original transmission and not on the different communication interface. The system may transmit a data transmission packet between two consolidated communications devices as a first data transmission packet on a first communication interfaces and a second data transmission packet, the same as the first communication packet, on a second communication interface, wherein the first and second communication interfaces comprise different communication protocols. The system may receive the first data transmission packet from one of the two consolidated communications devices at the other of the two consolidated communications devices, and the other of the two consolidated communications devices configured to send the first data transmission packet on to a third consolidated communication device when the first data transmission is determined to be a complete transmission. The first data transmission may be sent to the third consolidated communication device before a second data transmission packet from one of the two consolidated communication devices is received.

In an exemplary embodiment a system of consolidated communication devices may be integrated into a surveillance system comprising a plurality of cameras, each in communication with a consolidated communication device. The plurality of nodes may be configured to redundantly communicate to another of the plurality of nodes using WiFi and LTE. The surveillance system may also be configured to associate metadata to a data stream providing instructions on how to recreate a complete data set using the data stream.

DESCRIPTION OF THE FIGURES

FIGS. 8A-8B illustrate an exemplary embodiment of an exemplary algorithm as described herein.

FIGS. 9A-9B illustrate an exemplary embodiment of an exemplary algorithm as described herein.

DETAILED DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Exemplary embodiments are directed at a surveillance system. The system may include a plurality of data generating devices, such as cameras, or other detector. The system may include a plurality of nodes, in which each data generating device corresponds to one of the plurality of nodes. Other combination of nodes to data generating devices may also be used. The nodes may include memory to store the data received by the data generating device. The nodes may communicate to each other and other portions of a back up system and/or network through one or more protocols. In an exemplary embodiment, the nodes communication wirelessly.

Although embodiments of the invention may be described and illustrated herein in terms of a camera surveillance system, it should be understood that embodiments of this invention are not so limited, but are additionally applicable to other combination of data sources. Furthermore, although embodiments of the invention may be described and illustrated herein in terms of a system having distributed storage and/or redundant communication protocols, it should be understood that embodiments of the invention may use any combination of features. For example, embodiments of the distributed storage system may be used in other applications outside of the surveillance system, and/or with or without the redundant communication. Similarly, the redundant communication methods described herein may be used in other applications outside of the surveillance system, and/or with or without the distributed storage.

Surveillance System/Camera

Figure 2:
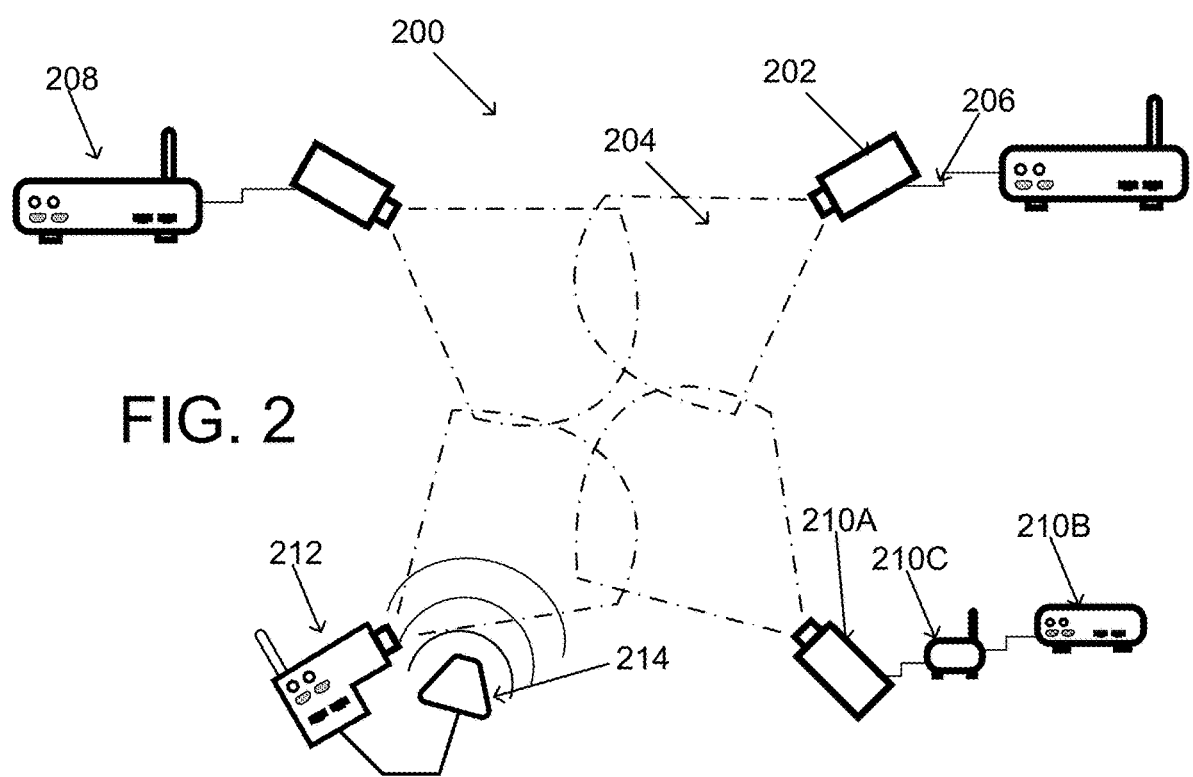
FIG. 2 illustrates an exemplary system configuration for a security system according to embodiments described herein.

FIG. 2 illustrates exemplary system configuration according to embodiments of the system described herein. The system configuration 200 includes a plurality of data generating sources 202 coupled to a plurality of nodes 208.

As shown, the system may include a plurality of data generating sources 202 comprising cameras and a plurality of nodes 208. The system may have a node 208 corresponding to each device 202. Each node/camera pair may be communicatively coupled either directly or through a communication/network device. As shown, the camera, node, and communication device may be integrated or separated in any combination. For example, the data generating device 202 may be separate from and communicatively coupled to a node 208 with an integrated communication device. The system may also use cameras 210A, separate from the node 210B, and separate from a communication device 210C, in which each is communicatively coupled either directly or indirectly to the other components. The camera, communication device, and node may be a single integrated unit 212. The system components may be coupled together or communicatively coupled, such as through Ethernet, USB cable, WiFi, or other wired or wireless connection. However, each node, camera, communication device may be integrated and/or recombined in any way and remain within the present disclosure. Accordingly, the camera, communication device, and/or node may be integrated into a single house or may be contained in any of one or more separate housings.

Exemplary embodiments include a plurality of data generating devices 202, such as cameras configured to receive images of an area 204 and generate a data stream from the captured images. Cameras are illustrated for sake of illustration only. Any data generating device may be used. The data generating device may include sensor data in addition or alternatively to image data. Exemplary embodiments may include image and/or audio data in different ranges, such as to for night vision or heat vision. In an exemplary embodiment, video, still image, camera, audio, or other surveillance data is captured and transmitted through the system according to embodiments described herein.

In an exemplary embodiment, the camera may be configured to receive and capture images on a continuous or non-continuous basis. In an exemplary embodiment, each camera 202 and/or node 208 may be configured to detect motion and/or proximity of an object within its viewing area 204. Once detected, a camera may be configured to capture images received by the camera. Such a non-continuous recording may reduce data storage and/or transmission overhead. If the system is configured for non-continuous data capture, the system may create storage offsets for cameras/nodes in areas that are highly trafficked, generating and capturing more data, than cameras/nodes in less trafficked areas generating and capturing less data. Accordingly, as illustrated in FIG. 2, some camera/nodes may reach storage capacity faster than others.

Exemplary embodiments include a plurality of nodes 208, 210B, 212. The plurality of nodes may include a processor and memory. In an exemplary embodiment, a camera or other data generating device may create a data stream. The node may receive the data stream as received data and store the received data within memory. In an exemplary embodiment, one or more nodes correspond to one or more cameras, such that a camera stores to a given node. Exemplary embodiments may also use a distributive storage method according to embodiments described herein. The system may therefore detect the storage level at one or more nodes and make storage decisions about a given received data and generate storage instructions according to the detected storage and storage decision.

Exemplary embodiments described herein may be used to create decentralized Power over Ethernet (PoE) Network nodes and cameras that may allow the end user to upgrade their surveillance system giving them the ability to install new security cameras and IT infrastructure in previously impossible or costly areas without the need for a centralized IDF or Server Room.

Storage

Figure 1:
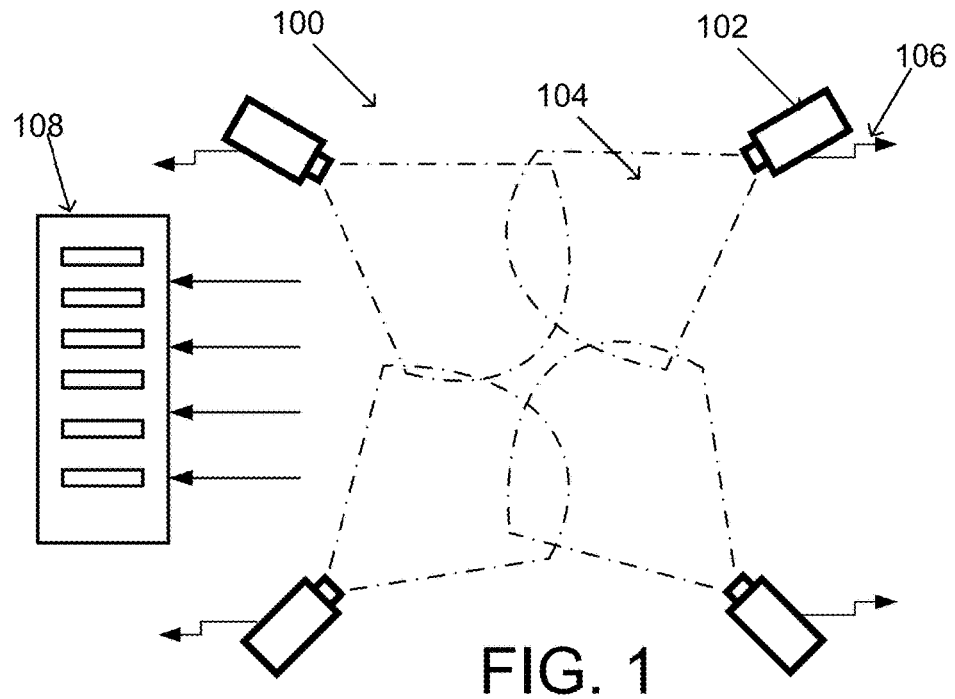
FIG. 1 illustrates an exemplary security system configuration.

In an exemplary embodiment, the system 200 may be configured to detect a storage level at a node and redirect incoming data from a camera/node to another camera/node or other location for storage. For example, the proximate node to a camera may receive incoming data, but may have a full memory (or other predefined used and/or available storage amount). The node may redirect the incoming data to another storage location after the predefined storage threshold has been met or surpassed. As illustrated by the purple line on FIG. 1, the redistribution may be to an offsite storage location, such as a cloud storage location. Other storage locations may be used, such as a conventional centralized and/or on-site storage location. As illustrated by the green line on FIG. 1, the redistribution may be one or more other nodes/cameras of the system that has available storage space. The system may use the redistribution as a redundant storage solution. For example, the system may be configured to store data locally at the node, while also sending and storing a copy remotely on a remote storage device, such as a cloud storage area.

Distributed Storage

Figure 3:
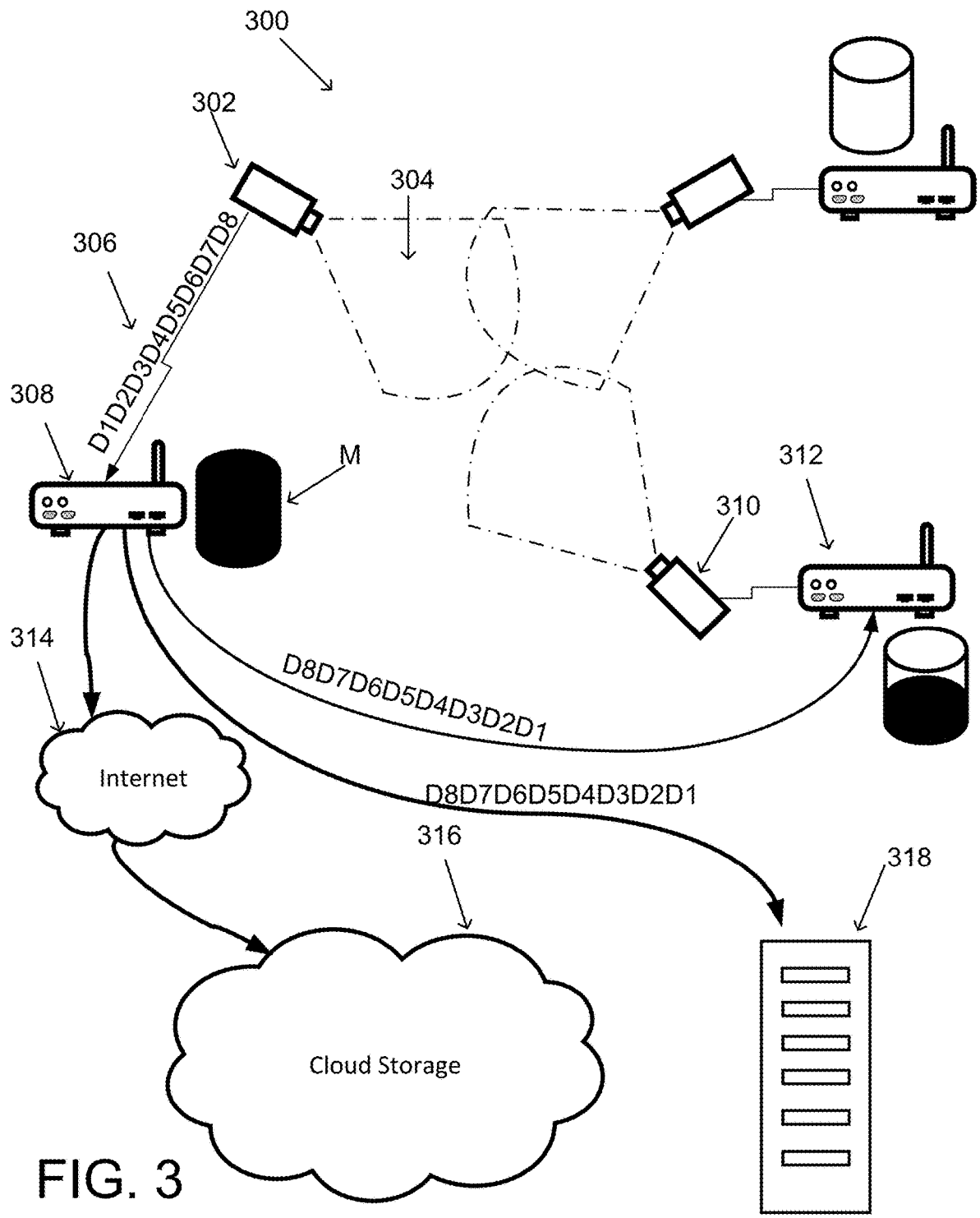
FIG. 3 illustrates an exemplary system architecture to represent exemplary data flows according to embodiments described herein.
Figure 4:
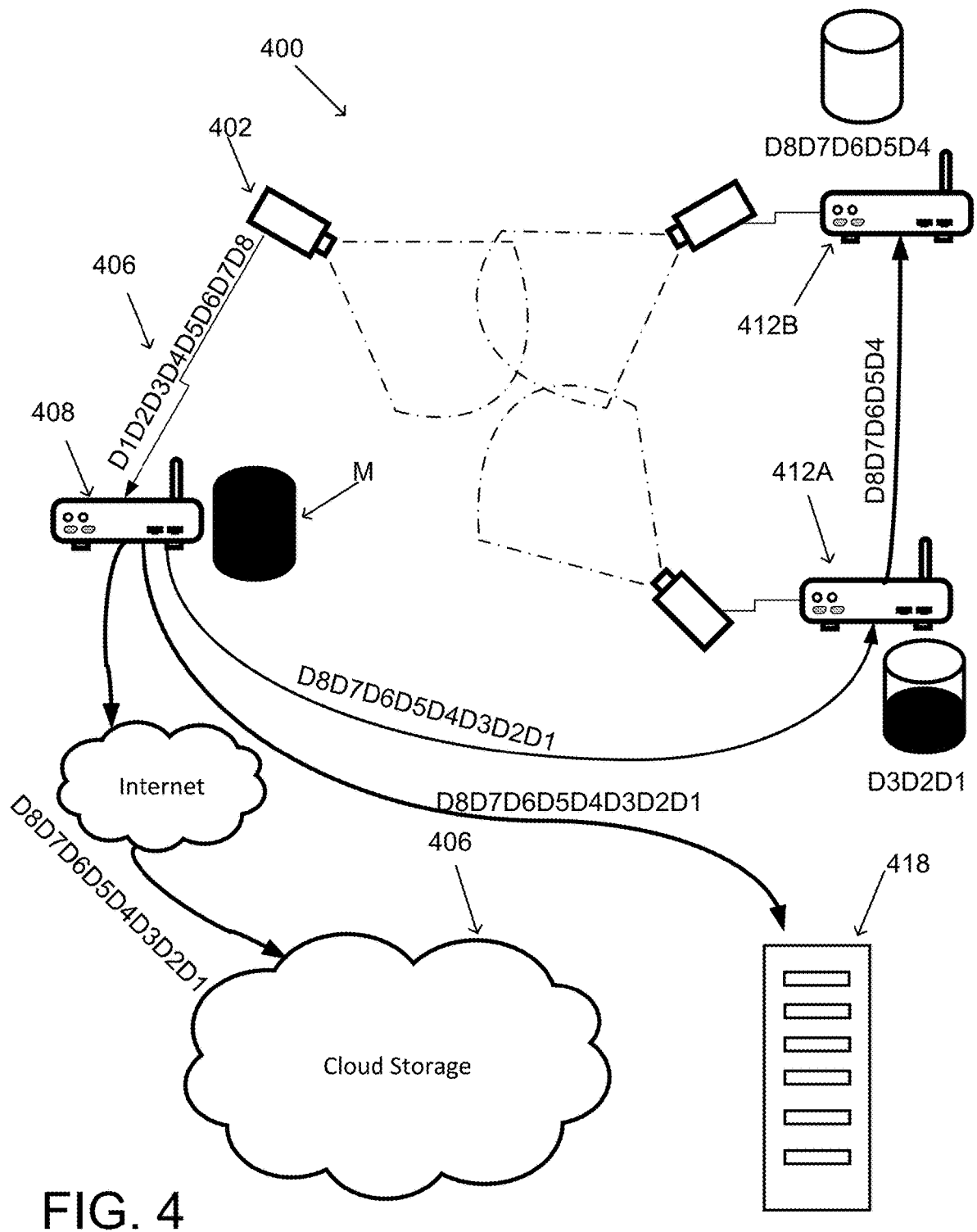
FIG. 4 illustrates an exemplary system architecture to represent exemplary data flows according to embodiments described herein.
Figure 5:
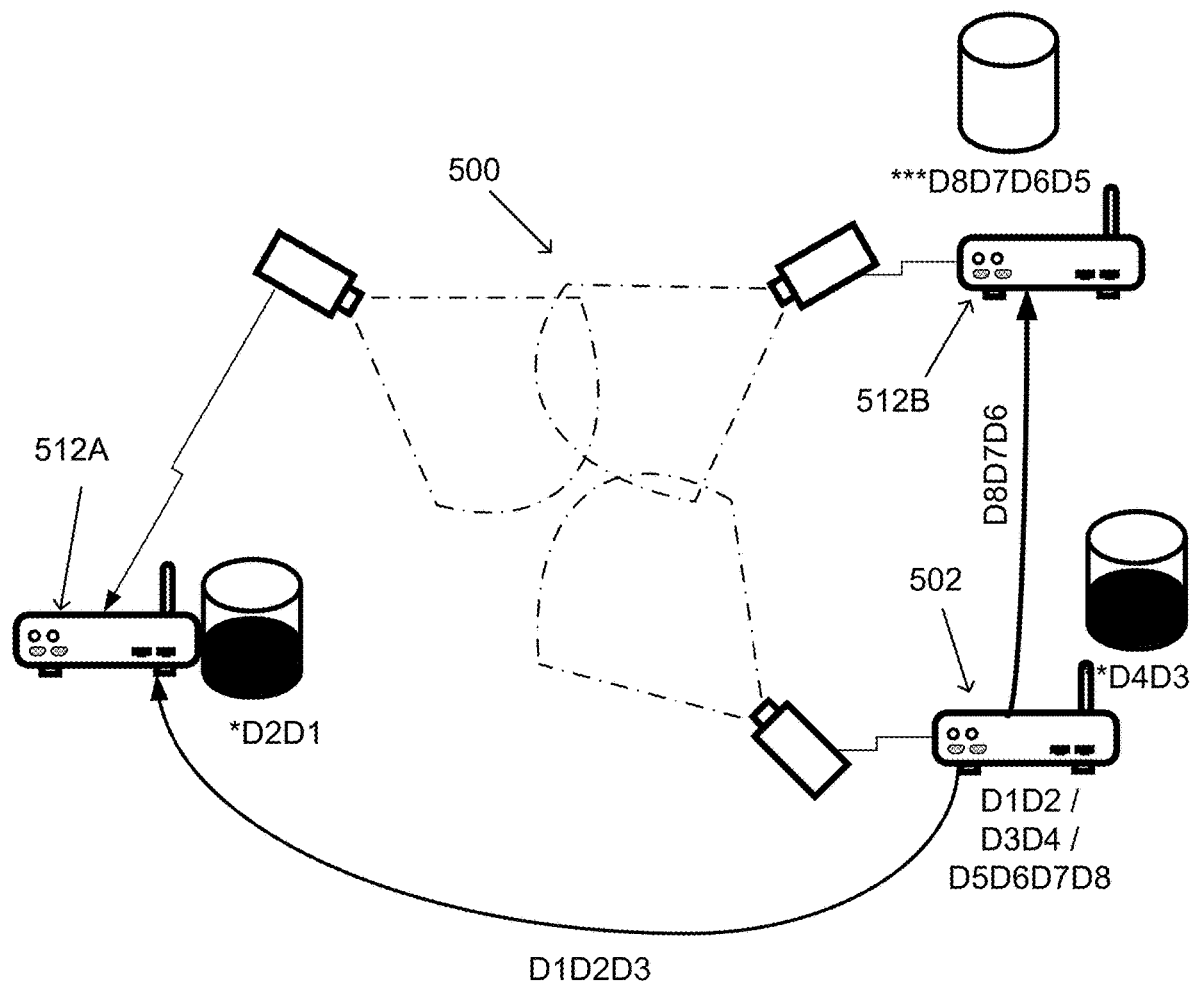
FIG. 5 illustrates an exemplary system architecture to represent exemplary data flows according to embodiments described herein.

FIGS. 3-5 illustrate exemplary embodiments of a distributed storage system in which the data generated form a data generating device is stored on one or more memories at one or more locations.

In an exemplary embodiment, the system may be configured to detect a storage level at a node and redirect incoming data from a camera/node to another camera/node or other location for storage. For example, a system 300 may include a plurality of cameras and a plurality of nodes comprising memory. A first node 302 detects a viewing area 304 and generates data 306 that is received by a node 308 positioned proximate to a first camera 302. The memory M of the first node 308 may be full (or other predefined used and/or available storage amount). The first node 308 may redirect the incoming data to another storage location after the predefined storage threshold has been met or surpassed. In an exemplary embodiment, the redistribution may be to an offsite storage location, such as a cloud storage location 316. The redistribution may be through a network 314, such as the internet. Other storage locations may be used, such as a conventional centralized and/or on-site storage location 318. In an exemplary embodiment, the redistribution may be one or more other nodes 312 and/or cameras 310 of the system that has available storage space. The system may use the redistribution as a redundant storage solution. For example, the system may be configured to store data locally at the node, while also sending and storing a copy remotely on a local and/or a remote storage device, such as a cloud storage area or conventional RAID system.

Each node may be configured to receive and store data received by other cameras. Exemplary embodiments of a node may include a small form factor computer including a processor, memory, and operating system. Exemplary embodiments of the system 400 and method described herein may receive one or more data streams 406 from one or more data generating devices 402 (such as the camera described herein). The one or more data streams may be fragmented and stored across one or more nodes of the system 412A, 412B. For example, a data stream D1D2D3D4D5D6D7D8 may be received at a first node 408 in which the memory M is full. The node may forward the data stream to a second node 412A in which the memory is partially full and a portion of the data stream, D1D2D3 can be stored. The second node 412A may forward the remaining data stream D4D5D6D7D8 to a third node 412B with empty memory available to store the remaining data stream. The fragmented data stream from the original data generating device may thereafter be stored across a plurality of nodes of the system. Exemplary embodiments may include a system and method for fragmenting data streams. Each fragmented data stream may include metadata for reconstructing the fragment with other fragments to reconstruct the data stream. The system may also be configured to send redundant or backup data streams to offside storage 406 or other storage locations 418.

Exemplary systems according to embodiments described herein may include a software controller at each node 502, 512A, 512B of the system 500. The software controller may be configured to generate an aggregated map of all available space of each node on the system. The software controller may then determine how to fragment a data stream based on available space and provide instructions and associated metadata for each fragment to identify where the fragmented piece should be directed through the system and the node to which it will be stored. For example, as seen in FIG. 5, the software controller at node 502 receives a received data stream of D1D2D3D4D5D6D7D8 and has information about the storage levels at the first node 502 of approximately half full, a second node 512 of approximately half full, and a third node 512B that is empty. The software controller of the first node 502 may fragment the data stream such that more of the data stream is sent and stored at the third node 512B than at the other two nodes 502 and 512A. Each of the stored data fragments may include metadata (illustrated as an * in FIG. 5). The metadata of each fragment may be used to identify how to reconstruct the data stream from the data. The metadata may include information of location fragments to create the data stream and the ordering of the fragments. For example, the metadata illustrated in FIG. 5 may include the location of the first portion of a data stream stored at the second node 512A, the second portion of the data stream stored at the first node 502, and the third and final portion of the data stream stored at the third node 512B.

Exemplary embodiments described herein may be used to provide an agnostic distributed file system. Exemplary embodiments may use storage space available at a plurality of different memory locations, either within a single device or across a plurality of devices. Exemplary embodiments are configured to use available storage detected on the system and sending data for storage on an available memory area without a specific address of the memory location being used to send the data.

Exemplary embodiments of the system described herein may permit each node device, whether it is a Windows, Mac, Linux computer, security camera, phone system, other system, or any combination thereof, installed in the network to automatically or manually add storage capacity to the file storage system. Exemplary embodiments are configured to receive information about available memory capacity at different nodes of the system, without specific addressing of the available memory. Exemplary embodiments are configured to send data to a node having available storage through the identity of the node and not a specific memory address.

Exemplary embodiments may use different algorithms for determining how to fragment data strings and/or where to store data fragments. For example, as seen in FIG. 3, data may be received at a node and the available memory at the node determined. If sufficient space is available, the data may be stored at the node. As illustrated in FIG. 4, if insufficient space is available, the data string may be fragmented to store the an amount to fill the available space and the remaining fragment passed to the next node. The next node may perform a similar assessment. Information about the storage locations of the fragments may be relayed back such that the metadata of the fragments may be updated accordingly to identify the locations of respective fragments. Alternatively, fragments may be indexed and each memory controller may keep a master memory location databased of which indexed fragment is at a node. The data stream may also be fragmented upon receipt based on other attributes beyond memory availability. For example, data streams may be fragmented to improve data integrity in the event any one node is compromised or unavailable. An example of segmenting data is illustrated in FIG. 5 in which the receiving node 502 fragments the data stream and then propagates the fragments to respective other nodes. The fragmenting may be determined based on the data stream size, communication relay timing, communication relay bandwidth, the available memory spaces at one or more nodes, a desired maximum data fragment size to improve integrity in the event of node failure, and combinations thereof.

Exemplary embodiments are configured to save data in file formats in which the memory locations used for different files or portions of a file is unknown to at least some of the nodes or all nodes of the system except the node in which the memory resides. In an exemplary embodiment, the system is configured to store memory to specific memory file locations. Each node may have information about which node corresponds to a file folder or portion of a file folder for storing information. Each node may not know the corresponding specific address location within the node that corresponds to the file folder or portion of the file folder. The local node in which the memory resides for the specific available memory may be managed locally by the operating system of the local node. In this way, the overall system may send universal instructions for managing data locations without specifically requiring an individual memory location or the specific language or protocols of memory storage of the individual device providing the available memory.

In an exemplary embodiment, the mapping of specific memory locations is managed only locally on the local device providing the memory, but is unknown or unavailable to the rest of the system or other nodes. A data storage construct of folders is provided herein as exemplary only. Any memory location or configuration may be used and fall within the scope of the present invention. The folder structure is used as an example of a naming convention used to identify memory locations separate from an actual memory location.

Exemplary embodiments of a system may include each node with a memory controller communicatively coupled thereto. A memory controller may be a separate hardware device communicatively coupled thereto to provide access to the memory of the node to the memory controller or may have the memory controller integrated directly into the node through incorporation of hardware, software, or a combination thereof. The memory controllers may be configured to store data locally at the memory available from the node or send data to another node for storage thereon. Each memory controller may be configured to know a naming convention that identifies available memory by the node providing the available memory. Each memory controller may be configured to send data or pass through data to another node for storage based on the naming convention without knowing the specific memory locations within the receiving node. Upon receipt by the receiving node or memory controller at the receiving node, the memory controller and/or local operating system may be configured to locally store the data according to the available space. Each local node or memory controller corresponding to a local node may therefore have access to specific memory locations available to the node.

Exemplary embodiments may include fault tolerant functions with redundant fault controllers and metadata systems that may allow access to the stored data at all times, no matter the circumstances, or allow access under select circumstances.

Exemplary embodiments may incorporate cloud system storages to provide redundant backup and/or add additional storage nodes or capacity into the network.

Exemplary embodiments may use multiple hardware and software configuration options that allow the solution to be deployed into any budget or network design. Exemplary embodiments can store across the cloud, use a storage controller in hardware and software installed locally, a software controller installed on the devices already on the network, or any combination that works within their network and operation. Exemplary embodiments of the storage controller and distributive storage methods described herein may permit a user to take advantage of storage already available and present on a system. For example, a location may have ten personal computers, such as desktops, on a network, and exemplary embodiments of the distributed storage system and methods described herein permit the system to determine a share size per device and automatically aggregate assigned capacity into the network growing the storage capacity. This same network may communicate with ten security cameras as well, which can also be added into the storage array. Such efficient use of storage already available on a network permits a lower cost solution, while maintaining data safety, integrity, and availability.

Exemplary embodiments of the storage system and method described herein is a distributed fragmenting file storage system built upon a combination of Distributed File System (DFS) and New Technology File System (NTFS) data protocols accessible to client operating systems across each storage node. In this example, a storage node is defined as a creatable container on the NTFS protocol within each host operating system. This is any file folder created on the node's host operating system. This system works within Windows, MacOS, and Linux based operating systems. The protocols and file folder structure and naming conventions are illustrative only. A storage node is not intended to be limited to any specific protocol of embodiment described herein.

Exemplary embodiment may include storage control software utilizing a Java Applet installed on each client device telling the host device to seek out other applets within the same networked subnet and communicate with each other for command instructions, passing these instructions to the host operating system through the protocols within each operating system (OS) and node. This allows exemplary embodiments to create a tunnel for data to flow through pre and post marked routing packets in and out of the applet to instruct the operating system to read or write defined bits of data to a specific folder within the host operating system and allows the host operating system to communicate through driver software designed specifically for the hard disk and operating system, allowing the operating system to manage communication for sector data to the physical disk. Exemplary embodiments of the storage control software of the applet does not have to communicate to the hard disk in the same way. Instead, hardware communications happen and may be contained within the operating system of the individual node. The storage control software is configured to read and write a file in a bit by bit fashion and appends meta data mapping to each bit passed through the applet to each folder within the network of storage nodes (folders created on the operating system assigned for communication to the applet). This meta data is passed across the applet tunnel and may be stored in its entirety on each node for redundancy and file recovery. Each file may be compared via Application Programming Interface (API) against the health of each host system and then balanced across the chosen nodes for each bit with meta data mapping being reported back to every node in the network through the meta ledger.

Figure 8B:
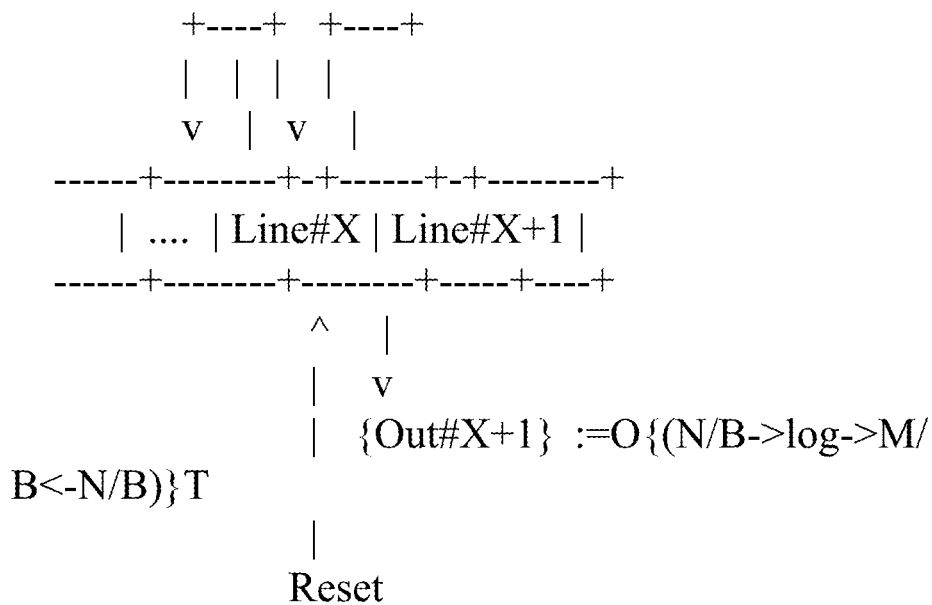
Figure 8B:
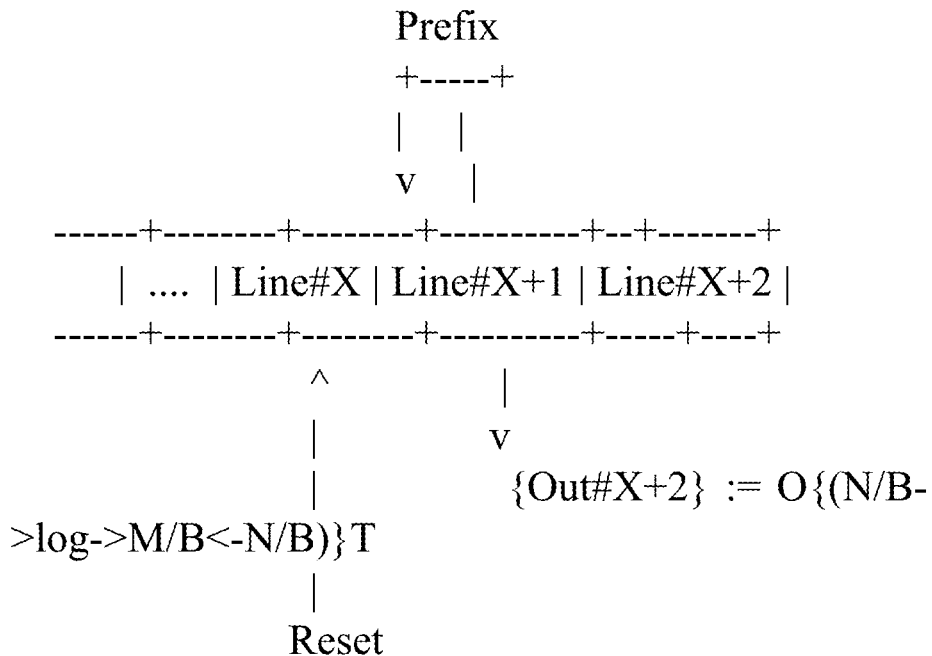

Exemplary embodiments may use a modified version of a simple compression algorithm on the LV4 open standard to fragment the data and create the meta data mapping instructions. An exemplary embodiment of an exemplary algorithm is illustrated in FIGS. 8A-8B.

Figure 9A:
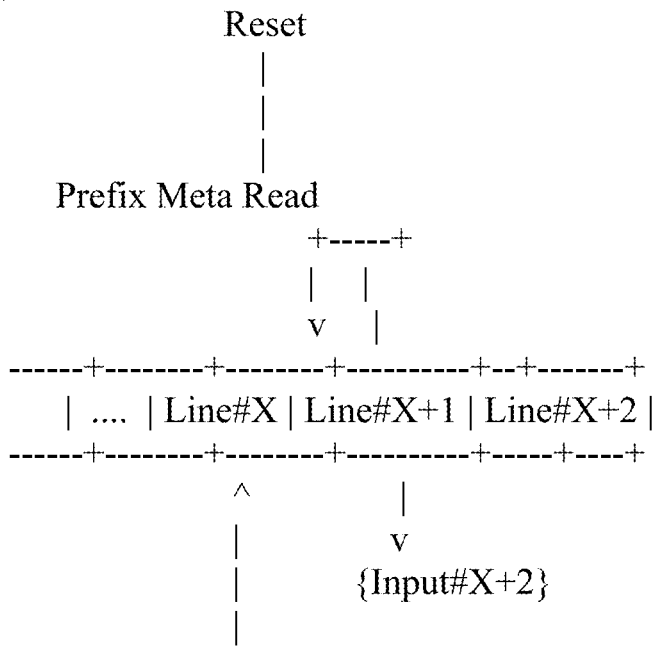
Figure 9A:
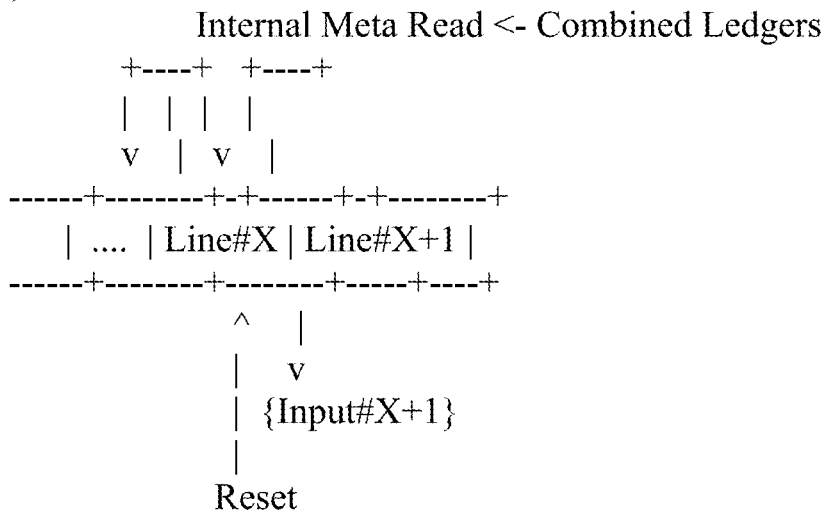
Figure 9A:
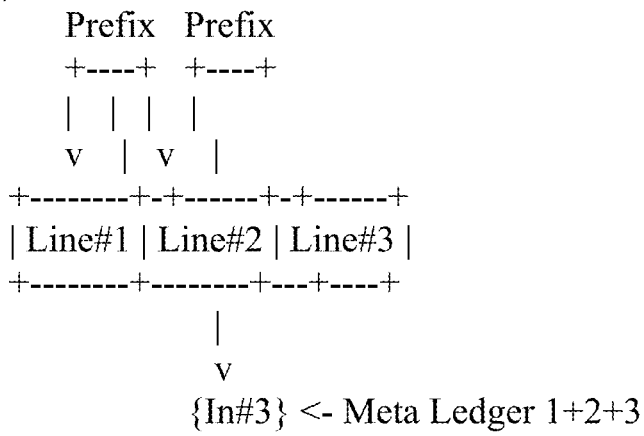

Exemplary embodiments of the control storage software may be configured to write the outputs and inputs of each algorithm running, (2 algorithms running, one for write compression and one for read decompression in reverse order to reconstruct the compressed fragmented mapped datasets as told by the meta data mapping). The file may be reconstructed upon decompression. FIGS. 9A-9B illustrate an exemplary embodiment of the control storage algorithm.

Utilizing the input and output compression and decompression scheming results of the algorithms, the software makes read and write requests to the host node's folder through the applet to the operating system, and the operating system returns the request through the applet back to the requesting node's operating system compressing or decompressing the file depending upon if it is a read or write request.

Upon installation of the Java applet into the host operating system, digital container sets may be created within the NTFS processes running within the host operating system allowing for the initial write of the meta ledger to the assigned folder from the operating system. The operating system treats this folder as a mounted NTFS disk through procedures and protocols built into each host operating system by the creator of the operating system. Essentially, the operating system treats the selected folder no different than a network shared folder through SAMBA (which is a standard Windows interoperability suite of programs for Linx and Unix) translating to the NTFS protocols allowing for shared network folders across multiple operating systems. Exemplary embodiments of the control storage software and data controller running within the Java applet will take the mounted folder in each node communicating from the host operating system and assign packet marks to build the meta ledger to assign bit marks to each appropriate node. This allows these bits marked to be mapped to the appropriate folder and node as the software compares the input and output of the compression algorithms running on each applet to choose node storage locations best suited for each bit. This also allows the capacity of each node added to the network to be reported to the software controller running on each node, and aggregate available storage capabilities of each node into a single virtual storage container within the software controller. Should a packet be returned to the software controller as undeliverable, the algorithms are retriggered through a script to check for faults within the data marks and redeliver the marked data bit to a different node through the applet. Any returned data bit is considered a faulty bit, and a cron job running every millisecond returns to the node OS that the algorithm needs to find a new home for that bit. This allows for a node to have a varying file capacity to be added into the available storage capacity in the software controller.

In an example system, Node 1 may have 1 gig of storage, Node 2 may have 1000 gig of storage, Node 3 may have 2000 gig of storage, which results in total to 3001 gig of available storage to all of the software controllers running within the applet ring (collection of nodes). This ability allows for large storage appliances (centralized storage systems, etc.) to be added as long as they have either a host operating system compatible with the Java Applet. This will allow non-traditional computing devices to be able to add storage capacity to the networks as long as they are capable of running a compatible OS and Java environment. For example, refrigerators with smart options running on Linux build of Android OS, or access points in the network running a Linux distro may be used to expand available storage on a network.

Exemplary embodiments of the system described herein may permit the distributed storage similar to RAID, but operates differently than the RAID protocol. RAID uses a software meta mapping controller that is self-contained that needs to communicate directly with the hard drives to determine the stored sector information of each file within the RAID's metadata. Exemplary embodiments described herein may use SAMBA protocols, not hardware protocols, to map the meta data of each file. RAID stripes data to drives, but, again, RAID is contained within the need for sector mapping data for the file, and it also is writing the entirety of each file to a set of duplicated sectors to multiple drives. This is why RAID with striping requires additional drives specifically for a redundant write of the file. In RAiD5, there are main drives and then slave drives for file redundancy after compression. The compression algorithms of the exemplary embodiments described herein are not compatible with RAID due to the fragmenting of data across multiple host folders and not drive sectors themselves.
Transmission As described previously with respect to FIG. 2, data generated by the camera 210A may be sent by the camera and received at the node 210B local to or corresponding to the camera. Each node may include memory for storing data received by the one or more cameras. Each node may be configured to receive and store data received by its immediately proximate camera.

However, each node may be configured to transmit data to one or more other nodes of the system, and/or remotely to other networked locations. Exemplary protocols for transmitting data may include, without limitation, TV White Space (TVWS), Long-Term Evolution (LTE), Ethernet, WiFi, optical, or other wireless or wired methods. Exemplary embodiments may incorporate redundant or dual communication links between one or more nodes. For example, a node may communicate with another node using LTE and WiFi to improve throughput by providing a redundant transfer scheme. Each node (or any combination of nodes) may include error checking to validate the incoming data before transmitting and/or storing the received data. Exemplary embodiments may also include redundant or different routing schemes such that packets of data fragments from a data stream may be sent along different routes or include transmission through one or more different nodes than one or more other data fragments from the same data stream.

In an exemplary embodiment, different protocols may be used based on different criteria. For example, the speed of transmission, length of transmission to another node, available bandwidth, security, and any combination thereof may be considered in selecting which one or more protocols may be used to transmit data from one node to another.

Exemplary embodiments of the plurality of nodes described herein may include a cluster of link server node devices configured to deliver uninterrupted high definition (up to 4k) video streams wirelessly throughout a secured decentralized network. The link offers a fully flexible, comprehensive surveillance system at a fraction of the cost of a traditional install. It may allow the end user to store footage locally, across a local virtual storage platform, and over a cloud storage service for a triple failsafe storage environment (or any combination thereof). The link server node may be based on a Power over Ethernet (PoE) concept, which allows easy installation, eliminates the need for costly IDF or Server Rooms. Each node can be accessed and controlled independently or as an entire system. The TVWS (or LTE or other communication) umbrella may permit an uninterrupted WiFi stream giving the user an improved strong signal and reduced system downtime as compared to conventional systems on the market.

Figure 6:
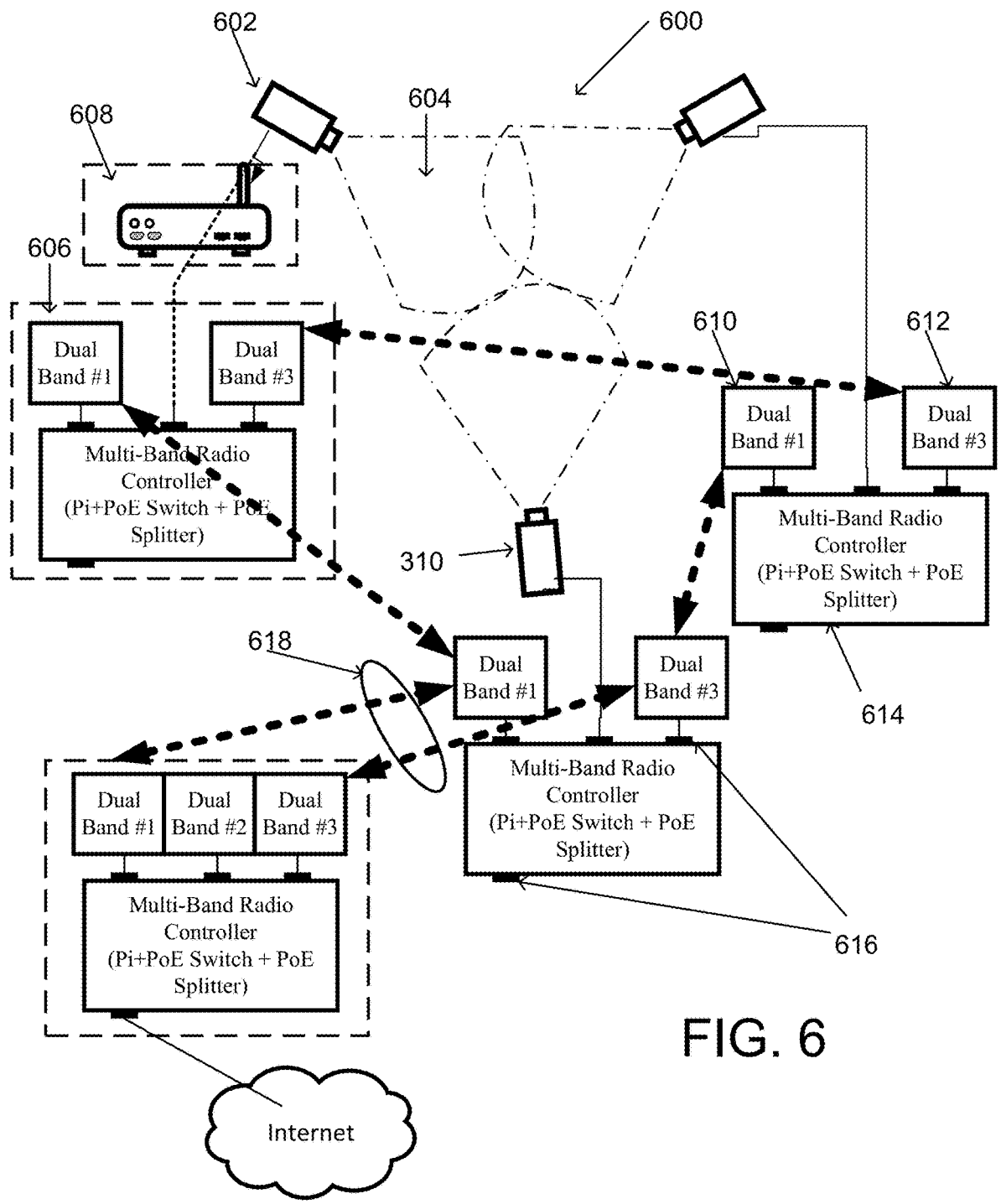
FIG. 6 illustrates an exemplary system architecture to represent communication paths and methods according to embodiments described herein.

FIG. 6 illustrates an exemplary system set up according to embodiments described herein. The system 600 includes a plurality of cameras 602 that capture images from a view area 604. The plurality of nodes 608 may include a communication module 606 incorporated therein or coupled thereto. Exemplary nodes may include a plurality of communication interfaces. One communication interface may be used to send and receive data to a coupled device. The one communication interface may be a wired or wireless interface. The node may be configured to integrate one or more devices into a mesh network without requiring multiple cabling access points for each device. Exemplary embodiments may use a communication module 606 having two (or more) communications interfaces 610, 612 for sending and receiving data wirelessly to one or more other exemplary nodes and/or to a wired connection point. The system may be configured to communicate through the two or more communications interfaces using different protocols. As illustrated, the communication interface 606 may include a first communication interface 610 and a second communication interface 612. When the communication interface 606 sends data through the communication module 606, it may do so over both communication interfaces, or any combination of the communication interfaces. Each node may support multiple Infrastructure SSIDs. Each radio or communication interface may include an independent radio, such as 2.4 GHz and 5.8 GHz radios configured in a mesh and/or infrastructure configuration to meet local service requirements. Each node may support PoE plug in 616.

In an exemplary embodiment, the system may be configured to bond 618 the transmissions through the two or more communications interfaces to send and receive redundant data for improved transmission time and/or accuracy. The system may be configured to provide handshaking signals such that the transmission of a data set is synchronized or verified for transmission losses. For example, if a data packet is sent across the two or more communications interfaces, the system may be configured to check a transmission loss on a receiving end of the communication link. If the system determines the data loss is within an acceptable limit, the system may proceed with the transmission that was first received and not wait for the transmission through the second communication interface. If a transmission loss is detected, then the system may be configured to receive and check the transmission through the second communication interface. The combination may therefore be used to improve time throughput, as the system can use the transmission that occurred the fastest, but still benefit from reduced transmission losses through the redundant system. The system may accommodate different loads across the different communication protocols. For example, if one method is in heavy use, the transmission speed may decrease, and thus the system will more likely use the transmission through the other protocol. However, with lower use, the other protocol may actually be the conventionally faster transmission protocol. The system may therefore take advantage of the faster transmission protocol based on the actual system implements and in use at the time of the transmission.

Exemplary embodiments may be used to redirect data traffic to different nodes within the mesh upon an indication of a failed node. When a data transmission results in a failure across the redundant transmission protocols or interfaces, the system may be configured to send the data packet through another node. The retransmission through another node may be though a different communication protocol. In an exemplary embodiment, the system may select a different communication protocol to accommodate or correlate to a transmission distance to the new node. For example, if the original transmission is over short range, the communication protocol for the original transmission may be one for higher throughput speeds at short range, but which may suffer greater transmission loss if over longer ranges. If the retransmission to another node requires longer transmission distances, such as to the next node in the chain, the communication protocol permitting for long range transmission while maintaining transmission fidelity may be selected for the retransmission.

Exemplary embodiments described herein may be a consolidated communications device 606 containing a multicore processor, DDR4 RAM modules, multi gigabit options, and interchangeable solid state hard drives through bus on the motherboard. This processing core can be coupled with additional communication devices such as computing boards with 802.x, LTE (1.9-3.9 ghz), TV White Space (900 mhz), or WIMAX radios through PCI busses built into the communication device. The architecture in the hardware decided upon gives the system the ability to process traffic across the networking interfaces in several capacities and configurations efficiently through a software based routing system running locally via a virtual machine.

In an exemplary embodiment, the virtual machine may include a modified Linux kernel utilizing, for example, Debian core capabilities and libraries. Linux kernels are the base software nearly all networking devices are built upon. Exemplary embodiments described herein may include a Linux kernel configured to create routing tables for each connected networking standard that can create individualized routing marks for bits of data flowing in and out of each communication method and migrate this data through pre and post routed data tables within the kernel running on virtual machine systems within the core operating system. These bits are may then be processed out of the virtual machine, into the core kernel and in/out of the physical hardware attached to the device. This allows the system to bond and aggregate data flowing through the compiled system in multiple option sets as chosen by the user or system configuration.

By utilizing both pre and post routing marks, specifically marked data can pass across the selected communications standard to the next device in the chain allowing it to flow to the devices or routed systems further up the network until it is processed or received at its desired destination. The system can pass these marked data bits individually, collectively, or aggregated all through the same tunnels increasing performance and reliability of the entire networking stack. This also allows for redundancy across a different standard if the data bit does not successfully travel down the marked pre and post routed paths.

Mesh networks are technically designed to redirect traffic across the same networking standard to self-heal a device that is not functioning correctly. Unlike these mesh networks, exemplary embodiments described herein allow the same device to route unsuccessful traffic across a different standard to the next device, and then move it to the appropriately marked standard to continue the delivery of the data bit. In the event of total device failure, utilizing standards like Long-Term Evolution (LTE) and TV Whitesapce (TVWS) allows a better delivery for larger distances to heal the network. Therefore, even if an entire node fails, the next node or another node may be in range to pick up the transmission. Even though these standards have slower throughput options on their respective frequencies, it allows the bit to travel more efficiently over distance and heal back onto the appropriately marked standard.

Exemplary embodiments may be used to drastically reduce networking traffic bottlenecks, and latency across the entire network may be reduced by allowing the devices processing power to manage these routing tables through multicore processors instead of forcing the entire network to convert to a slower throughput standard until the device is replaced. Bottlenecks may be contained within one device with significant processing power. This especially shows in streaming and buffering environments, as the processing power of the aggregate of all devices are allowed to essentially cluster process the network traffic and share hardware resources to improve an efficient pipe for the data flowing across the network.

In an example environment of a casino, or small city, a system may include 100 communication nodes to define a system deployed utilizing an LTE radio, a 802.11N 2.4 GHz and 5 GHz radio, and an 802.11AC 5 GHz radio setup within each unit. LTE's distance allows the system to create a packet mark of 1 for backhaul traffic, and 2 for traffic intended to flow specifically across the LTE frequency. The system may be configured to use a packet mark of 3 for 2.4 GHz traffic, 4 for 5 GHz N traffic and 6 for AC traffic. Through the USB bussing built onto the motherboard in the system, the system may connect a surveillance camera and pass the feed of the camera across packet mark 2 to be carried through the network and home to the VMS system across the marked 1 tunnel. Each unit may carry ping traffic to the next unit across packet mark 1 for redundancy triggers within the routing tables. All public traffic (0.0.0.0/0) routed traffic may also be packet remarked 1 upon entering the routing table to be carried to the pipe connection to the world of the facility. The system may be configured through the routing table to ping 5 GHz traffic between each unit on packet mark 4 and tell the software to move traffic marked 2,1 that is undeliverable back across packet mark 4 and out through the marked 1 tunnel. Traffic marked 3 is for public connectivity (guest WiFi, etc). Should traffic marked 1 be undeliverable it may travel across marks 4 and 6 to the next unit. This unit's routing table will remark this traffic mark 1 and continue to deliver the traffic across the back haul tunnel created until the traffic reaches the end destination to travel out to the 0.0.0.0/0 tunnel in the last/first routed device to the internet.

For aggregation, an exemplary embodiment of the system may bond these marks in the routing table to be processed at each device's virtual machine (VM) (multicore processor, massive RAM, SSD). M2+M3+M4+M5+M6→M1 happens at the processor and passes through the hardware as one packet set to the next device until 0.0.0.0/0 is reached. All of this may be interchangeable in the routing tables. M1 can be assigned to 802.11AC which is the fastest throughput channel available if the device distances are close. In a long distance scenario (10-15 miles between devices) M1 could be passed across TVWS. However, this would reduce throughput speeds where 0.0.0.0/0 are met. Latency and redundancy may be maintained through the chain and pipes created in the routing tables. In redundancy, the table simply shifts. M2+M3+M4−M5+M6→M4+M1 and the next device would process this into the routing table and output M5+M2+M3+M4+M6→M1 to the next device which would place it back into the packet mark order that is preset as the base order. In the event of M1 undelivered traffic, the output would then become −M1+M2+M3+M4+M5+M6→M4 and delivered to the next device that would then place it back into the correct sequence.

Exemplary Features

Figure 7:
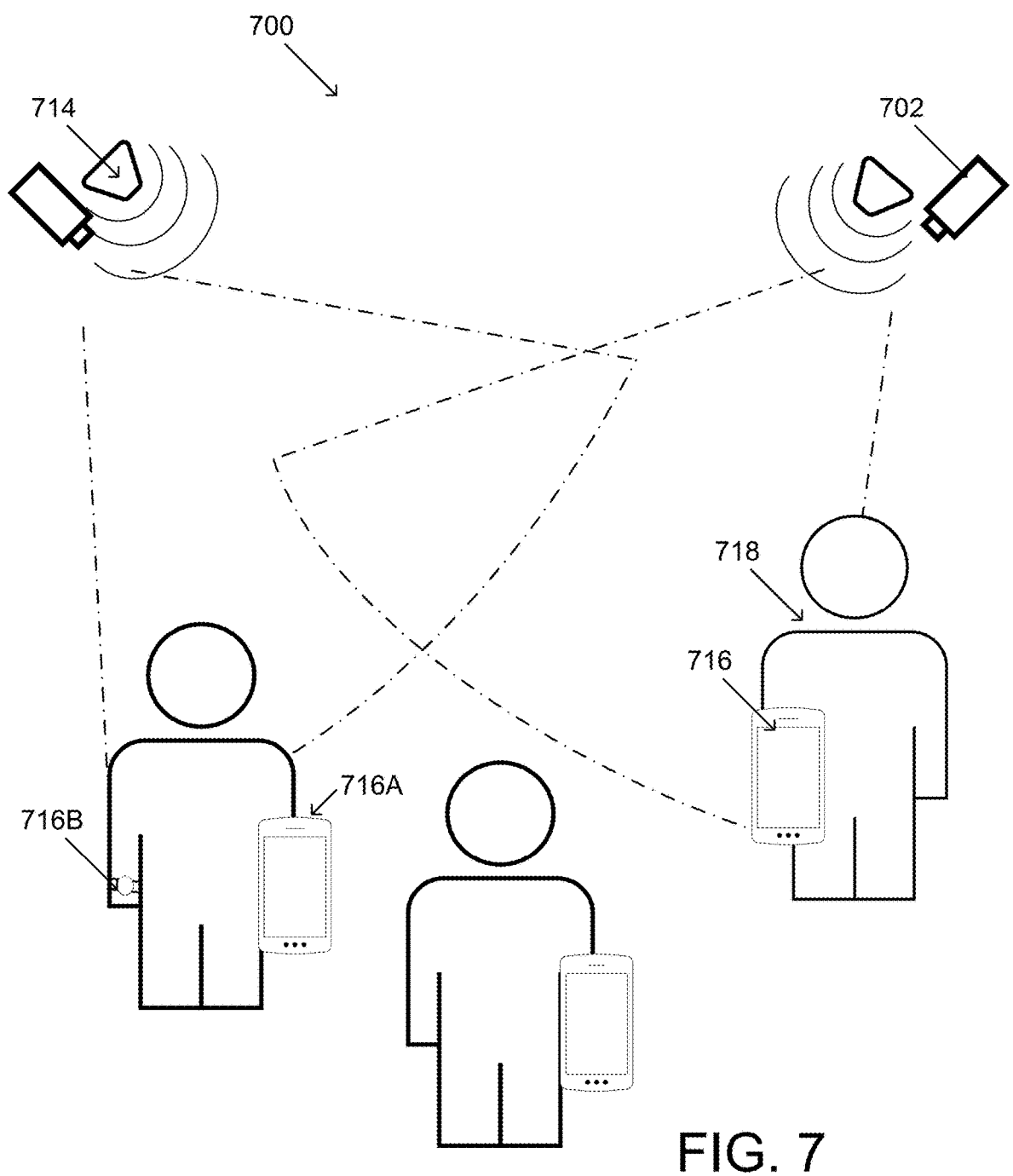
FIG. 7 illustrates an exemplary system application to represent the detection of a tag in proximity of one or more nodes.

Exemplary embodiments may include a video management system. The system may be configured to record one or more tags (that may include any received data, marker, identifier, information, etc.) and associate the tag with the captured data stream from the camera. For example, referring to FIGS. 2 and 7, the system 200, 700 may include one or more transmitter/receivers 214, 714 configured to ping a mobile electronic device 716 of a user 718 and retrieve an identification number from the mobile electronic device of the user, such as a MAC address, or other device ID. The system may be able to detect electronic identifiers from different electronic devices 716, such as, for example, smart phone 716A, smart watch 716B, tablets, e-readers, laptops, pedometers, personal monitors, sensors, ID tags, etc. Exemplary embodiments may include a database management system and/or metadata generation that stores the tag, such as the device ID, with the data stream from a camera, thereby associating an identification in proximity to a camera with the camera data stream and/or frames of the camera at the time the tag is detected. Exemplary embodiments may be configured to detect a signal strength of the tag source (such as a signal strength from a mobile device during detection of the device ID) such that detection of the tag from multiple nodes may be used to triangulate and/or approximate a location of the device relative to the plurality of nodes. Exemplary embodiments may therefore capture and/or store a tag, such as a device ID (e.g. MAC address), timestamp associated with the detected tag, signal strength, related node detecting the tag, or closest camera associated with the detected tag.

Exemplary embodiments of the video management system may be used to retrieve associated data stream(s) corresponding to a desired tag, e.g. device ID. The system may be able to generate a video stream from a series of data streams captured from different cameras of the system in which a desired tag is detected. The different data streams that have a detected tag associated therewith may be played or combined sequentially based on the time a tag, such as the device ID, is detected and/or a signal strength of the device ID relative to the camera and/or node associated with the camera.

Exemplary embodiments may include additional features. For example, during transmission, the system may be configured to detect the presence of an unauthorized addressed device within the system. For example, if a tag is detected associated with an unauthorized user or personnel, the unauthorized tag may trigger the system to send an error notification and/or stop transmitting data packets. The system may be configured to send notifications, security alerts, or otherwise identify unauthorized access.

Exemplary embodiments described herein may include any combination of features, benefits, and components described herein, including, without limitation (in any combination): reduction of 40%-60% of traditional labor installation costs, reliable WiFi (or other transmission protocol) connectivity with TVWS (or LTE or other combination of transmission protocols) backup, virtual storage software, onboard 1T of storage (or other desired amount) per node, encrypted storage to increase data protection, cloud storage backup, Power over Ethernet installation, decentralized network to reduce or eliminate IDF or Server Rooms, and/or a one box turnkey surveillance solution.

Exemplary embodiments of the system described herein can be based in software and/or hardware. While some specific embodiments of the invention have been shown, the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. Specifically, exemplary components are described herein. Any combination of these components may be used in any combination. For example, any component, feature, step or part may be integrated, separated, sub-divided, removed, duplicated, added, or used in any combination and remain within the scope of the present disclosure. Embodiments are exemplary only, and provide an illustrative combination of features, but are not limited thereto.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A consolidated communications system, comprising:
    a sending node having a first processor, a first memory, and a first plurality of communications interfaces; and
    a receiving node having a second processor, a second memory, and a second plurality of communications interfaces;
    wherein the sending node through the first memory comprises non-transitory machine readable instructions that when executed by the first processor is configured to: simultaneously send through the first plurality of communication interfaces a data packet across at least two communication protocols to the receiving node,
    wherein receiving node through the second memory comprises non-transitory machine readable instructions that when executed by the second processor is configured to: determine whether the data packet received first in time from the at least two communication protocols is complete within an acceptable tolerance and retransmit the data packet received first in time over at least two other communication protocols before the data packet received second in time from the at least two communication protocols is received,
    wherein the receiving node through the second memory and the non-transitory machine readable instructions that when executed by the second processor is further configured to determine whether the data packet received first in time from the at least two communication protocols is not complete based on being outside the acceptable tolerance and wait for the data packet received second in time from the at least two communication protocols and determine whether the data packet received second in time from the at least two communication protocols is complete and retransmit the data packet received second in time over at least two other communication protocols.

2. The consolidated communications system of claim 1, further comprising:
    a second receiving node;
    wherein the receiving node through the second memory and the non-transitory machine readable instructions that when executed by the second processor is further configured to determine whether the data packet received second in time from the at least two communication protocols is not complete based on being outside the acceptable tolerance and send a retransmit request to the sending node,
    wherein the sending node through the first memory and the non-transitory machine readable instructions that when executed by the first processor is further configured to: simultaneously resend through the first plurality of communication interfaces the data packet across at least two other communication protocols to the receiving node, wherein the at least two communication protocols are different from the at least two other communication protocols.

3. The consolidated communications system of claim 1, further comprising:
    a second receiving node;
    wherein the receiving node through the second memory and the non-transitory machine readable instructions that when executed by the second processor is further configured to determine whether the data packet received second in time from the at least two communication protocols is not complete based on being outside the acceptable tolerance and send a retransmit request to the sending node,
    wherein the sending node through the first memory and the non-transitory machine readable instructions that when executed by the first processor is further configured to: simultaneously resend through the first plurality of communication interfaces the data packet across at least two communication protocols to the second receiving node.

4. The consolidated communications system of claim 3, further comprising:
a second receiving node; and
wherein the sending node through the first memory and the non-transitory machine readable instructions that when executed by the first processor is further configured to: simultaneously send through the first plurality of communication interfaces the data packet across at least two communication protocols to the second receiving node.

5. The consolidated communications system of claim 1, wherein the sending node through the first memory and the non-transitory machine readable instructions that when executed by the first processor is further configured to: bond two data packs when data packets are simultaneously sent across the at least two communication protocols to the receiving node.

6. The consolidated communications system of claim 5, wherein the bonding is created by using pre and/or post routing marks sent with the data packets to the another node.

7. The consolidated communications system of claim 1, wherein the sending node through the first memory and the non-transitory machine readable instructions that when executed by the first processor is further configured to: synchronize the sending of two data packets when data packets are simultaneously sent across the at least two communication protocols to the receiving node.

8. The consolidated communications system of claim 7, wherein the sending node and the receiving node are configured to provide handshaking signals such that a transmission of simultaneously sent data pack across the at least two communication protocols are synchronized and/or verified for transmission losses.

9. The consolidated communications system of claim 1, further comprising:
a second receiving node;
a final destination node; and
wherein the sending node through the first memory and the non-transitory machine readable instructions that when executed by the first processor is further configured resend the data packet to the second receiving node using pre and post routing marks allowing the data packet to traverse the system to a final designation node.

10. The consolidated communications system of claim 1, wherein the non-transitory machine readable instructions of the sending node includes a software based routine system that when processed by the first processor runs locally via a virtual machine on the sending node.

11. The consolidated communications system of claim 10, wherein the non-transitory machine readable instructions of the sending node includes routing tables and instructions to configure the sending node to transmit data using routing marks received from one or more of the plurality of communication interfaces.

12. The consolidated communications system of claim 1, wherein the non-transitory machine readable instructions of the sending node is configured when executed by the first processor to select the at least two communication protocols from the first plurality of communication interfaces determined based on a distance from the sending node to the receiving node.

13. The consolidated communications system of claim 1, wherein the non-transitory machine readable instructions of the sending node is configured to select the at least two communication protocols from the first plurality of communication interfaces used to send the data packet to the receiving node based on any combination of a distance from the sending node to the receiving node, a speed of transmission of each of the plurality of communication interfaces, available bandwidth of each of the plurality of communication interfaces, or a security of each of the plurality of communication interfaces.

14. The consolidated communications system of claim 13, wherein the non-transitory machine readable instructions of the sending node is configured to create routing tables for each networking standard of each of the plurality of communication interfaces.

15. The consolidated communications system of claim 13, wherein the non-transitory machine readable instructions of the sending node is configured to use pre- and post-routing marks in a header of the data packet to determine a final node to receive the data packet.

16. The consolidated communications system of claim 15, wherein the non-transitory machine readable instructions of the receiving node is configured to use the pre- and post-routing marks on the data packet to determine that the data packet is intended for the receiving node and not send the data packet onto another node.

* * * * *